(12) United States Patent
Breiling et al.

(10) Patent No.: US 7,372,802 B2
(45) Date of Patent: May 13, 2008

(54) MESSAGE COMMUNICATION VIA CHANNELS HAVING STRONG FADING

(75) Inventors: Marco Breiling, Erlangen (DE); Johannes B. Huber, Langensendelbach (DE); Alexander Lampe, Leipzig (DE); Ernst Eberlein, Grossenseebach (DE)

(73) Assignee: Fraunhofer - Gesellschaft zur Foerderung der angewandten Forschung e.V., Munich (DE)

( * ) Notice: Subject to any disclaimer, the term of this patent is extended or adjusted under 35 U.S.C. 154(b) by 590 days.

(21) Appl. No.: 10/985,566

(22) Filed: Nov. 10, 2004

(65) Prior Publication Data

US 2005/0111347 A1 May 26, 2005

Related U.S. Application Data

(63) Continuation of application No. PCT/EP03/04759, filed on May 6, 2003.

(30) Foreign Application Priority Data

May 10, 2002 (DE) ............................... 102 20 892

(51) Int. Cl.
*H04J 11/00* (2006.01)
*H04J 3/16* (2006.01)
*H03D 1/04* (2006.01)
*H04B 7/10* (2006.01)
*H04B 1/00* (2006.01)

(52) U.S. Cl. ...................... 370/206; 370/465; 375/267; 375/346; 375/347; 455/63.1; 455/296

(58) Field of Classification Search ...................... None

See application file for complete search history.

(56) References Cited

U.S. PATENT DOCUMENTS 5,341,395 A * 8/1994 Bi ............................... 370/342

(Continued)

FOREIGN PATENT DOCUMENTS

WO    WO 00/36783    6/2000

(Continued)

OTHER PUBLICATIONS

Brunel, L. and D. Mottier; Iterative Interference Cancellation Scheme with Pilot-Aided Space-Time Estimation in DS-CDMA Systems; 2001; IEEE.

(Continued)

*Primary Examiner*—Huy D. Vu
*Assistant Examiner*—Nittaya Juntima
(74) *Attorney, Agent, or Firm*—Glenn Patent Group; Michael A. Glenn

(57) ABSTRACT

In a transmitting/receiving concept a redundancy-adding encoder is used in order to obtain two data streams for different transmitters. In the receiver, the receiving signal is sampled by a first sampler synchronous to the first transmitter and is output by a second sampler synchronous to the second transmitter in order to obtain a first and a second receiving signal which are fed to a trellis decoder to obtain a decoded first and second receiving subgroup of code units which are again fed to a calculating means in order to calculate the interference signals which are then combined with the corresponding receiving signals for an interference reduction. The iterative concept enables an interference reduction for receiving signal generated by two spatially separated transmitters. The receiver concept shows a quick convergence and thus enables the two transmitters to transmit in the same frequency band.

10 Claims, 6 Drawing Sheets

U.S. PATENT DOCUMENTS

| | | | | |
|---|---|---|---|---|
| 5,887,035 | A * | 3/1999 | Molnar | 375/340 |
| 5,991,273 | A * | 11/1999 | Abu-Dayya | 370/252 |
| 6,188,717 | B1 * | 2/2001 | Kaiser et al. | 375/148 |
| 6,304,618 | B1 * | 10/2001 | Hafeez et al. | 375/341 |
| 6,691,263 | B2 * | 2/2004 | Vasic et al. | 714/709 |
| 6,847,688 | B1 * | 1/2005 | Molnar et al. | 375/344 |
| 7,170,948 | B2 * | 1/2007 | Berthet et al. | 375/267 |
| 2002/0110206 | A1 * | 8/2002 | Becker et al. | 375/346 |
| 2003/0161258 | A1 * | 8/2003 | Zhang et al. | 370/203 |
| 2004/0083082 | A1 * | 4/2004 | Onggosanusi et al. | 703/2 |

FOREIGN PATENT DOCUMENTS

| | | |
|---|---|---|
| WO | WO 01/13532 | 2/2001 |

OTHER PUBLICATIONS

European Telecommunication Standard; May 1997.

Lin, Xiaotong and R. Blum; Improved Space-Time Codes Using Serial Concatenation; Jul. 2000, IEEE.

Sellathurai, M. and S. Haykin; A Simplified Diagonal BLAST architecture aith iterative parallel-interference cancellation receivers; Jun. 2001; IEEE.

Su, Hsuan-Jung; Space=Time Codes with Full Antenna Diversity; Jan. 2001; IEEE.

Van Wyk, D. and L.P. Linde; Fading Correlation and its Effect on the Capacity of Space-Time Turbo Coded DS/CDMA Systems; 1999; IEEE.

Yong, W., W. Haifeng, Y. Xiao-Hu, and C. SHiXin; Multiuser Detector with Transmit Diversity in the Convolutionally Coded DS/CDMA, 2000, IEEE.

"Optimal Decoding of Linear Codes for Minimizing Symbol,Error Rate"; IEEE Transactions of Information Theory, Mar. 1974.

Picinbono, B., "On Circularity"; IEEE Transactions on Signal Processing, vol. 42, No. 12, Dec. 1994.

Hagenauer, J.. et al.; "Iterative Decoding of Binary Blaock and Convolutional Codes", IEEE Transactiuons on Information Theory, Mar. 1996.

Mueller, et al.; "Iterated Soft-Decision interference Cancellation for CDMA", 1998, Broadband Wireless Communications, Transmission, Access and Services.

Giridhar, K., et al. Nonlinear Techniques for the Joint Estimation of Cochannel Signals. IEEE Transactions on Communications. vol. 45. No. 4, Apr. 1997.

Sellathurai, M., et al. A Nonlinear Iterative Beamforming Technique for Wireless Communications. IEEE. 1999.

* cited by examiner

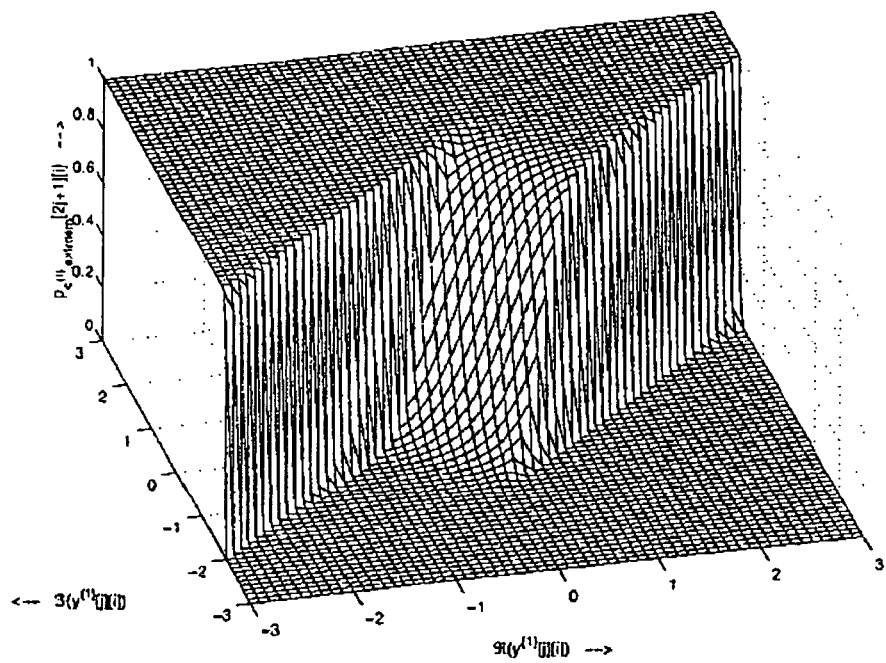
FIGURE 9
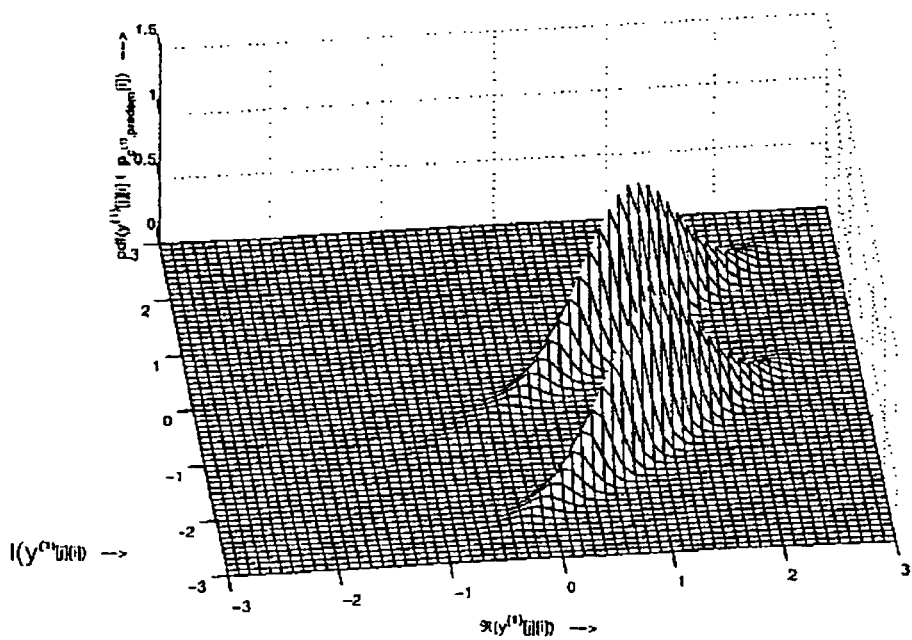
Fig. 8.
FIGURE 10

MESSAGE COMMUNICATION VIA CHANNELS HAVING STRONG FADING

CROSS-REFERENCE TO RELATED APPLICATIONS

This application is a continuation of co-pending International Application No. PCT/EP03/04759, filed May 6, 2003, which designated the United States and was not published in English.

BACKGROUND OF THE INVENTION

1. Field of the Invention

The present invention relates to a digital communication technique and in particular to concepts for a message communication via channels having a strong fading, like e.g. radio channels.

2. Description of the Related Art

WO 00/367,783 discloses a device and a method for transmitting information and a device and a method for receiving information. The device for transmitting information includes an information source, a redundancy-adding encoder having a code rate smaller than ½, a separator for separating the output of the encoder into two separated data streams, wherein a data stream is transmitted via a first channel, while the other data stream is transmitted via a second channel. The redundancy-adding encoder enables a forward error correction which is employed in a receiver-sided decoder in order to guarantee a good receiving quality.

The first and the second channel are different by the fact that they are spatially different and that in addition a time diversity function is integrated, i.e. in so far that an information transmitted via the first channel is again transmitted via the other channel at a later point of time.

On the receiver side two receivers exist, which are different from each other, for receiving the signal transmitted via the first channel on the one hand and receiving the signal transmitted via the other channel on the other hand. The receiver output signals are combined using a combiner and fed to a decoder, which is for example set up as a Viterbi decoder and whose output values are fed into a Reed-Solomon decoder.

In this known transmitting/receiving system, which may be employed using two satellites arranged at different positions as a transmitter, the satellites are implemented such that they transmit in different frequency bands. This way it is easily possible to differentiate the signal of the one satellite from the signal of the other satellite, as the satellite receiving signals lie in different frequency bands and may be received in a frequency-selective way.

Disadvantageous about this concept is the fact, however, that two complete frequency bands are required, i.e. a first frequency band on which the first satellite is transmitting and a second frequency band on which the second satellite is transmitting.

In general, however, the bandwidth of one transmission channel is a scarce commodity, so that frequently only very little bandwidth is available for an application or that the bandwidth required by one application has to be paid for expensively. This substantially increases the costs for a system. In particular with broadcasting applications in which the development and installation effort of the transmitters and the satellites has to be divided among the receiving devices, this leads to a rise in costs of the receiving devices. In particular on the competitive market of broadcasting receivers, however, already little or mean price differences may cause that one system is accepted on the market, while another system does not prevail and disappears from the market.

SUMMARY OF THE INVENTION

It is the object of the present invention to provide a more cost-effective transmitting/receiving concept.

In accordance with a first aspect, the present invention provides a receiving device for receiving an overlaid receiving signal corresponding to a superposition of a first and second transmitting signal, respectively, transmitted by a first transmitter and a second transmitter arranged remote from the first transmitter, wherein the first and the second transmitting signals lie in the same frequency band, wherein the first transmitting signal is generated using a first transmitting subgroup of code units, wherein the second transmitting signal is generated using a second transmitting subgroup of code units, wherein the first transmitting subgroup of code units and the second transmitting subgroup of code units together represent a plurality of code units which were generated by a redundancy-adding encoding from an information word with a plurality of information units, having means for sampling the overlaid receiving signal synchronously to the first transmitter in order to obtain a first receiving signal associated with the transmitted first transmitting signal, and for sampling the overlaid receiving signal synchronously to the second transmitter in order to obtain a second receiving signal associated with the transmitted second transmitting signal; a decoding means for decoding the first and the second receiving signal in order to obtain a first receiving subgroup of code units associated with the first transmitting subgroup of code units, and to decode the first and the second receiving signal in order to obtain a second receiving subgroup of code units associated with the second transmitting subgroup of code units; a calculating means for calculating a first interference signal using the second receiving subgroup of code units and a second interference signal using the first receiving subgroup of code units; an interference reduction means for combining the first interference signal with the first receiving signal and for combining the second interference signal with the second receiving signal in order to obtain an improved first receiving signal and an improved second receiving signal; and a control means for controlling the decoding means so that the same decodes the improved first receiving signal and the improved second receiving signal and outputs the information word with the plurality of information units based on the improved first receiving signal and the improved second receiving signal.

In accordance with a second aspect, the present invention provides a method for receiving an overlaid receiving signal corresponding to an overlay of a transmitted first and second transmitting signal, respectively, by a first transmitter and by a second transmitter which is arranged remote from the first transmitter, wherein the first and the second transmitting signals lie in the same frequency band, wherein the first transmitting signal is generated using a first transmitting subgroup of code units, wherein the second transmitting signal is generated using a second transmitting subgroup of code units, wherein the first transmitting subgroup of code units and the second transmitting subgroup of code units together represent a plurality of code units which were generated by a redundancy-adding encoding from an information word with a plurality of information units, with the steps of sampling the overlaid receiving signal synchronously to the first transmitter in order to obtain a first receiving signal associated with the transmitted first transmitting signal; sampling the overlaid receiving signal synchronously to the second transmitter in order to obtain a second receiving signal associated with the transmitted second transmitting signal; decoding the first and the second receiving signal in order to obtain a first receiving subgroup of code units associated with the first transmitting subgroup of code units; coding the first and the second receiving signal in order to obtain a second receiving subgroup of code units associated with the second transmitting subgroup of code units; calculating a first interference signal using the second receiving subgroup of code units and a second interference signal using the first receiving subgroup of code units; combining the first interference signal with the first receiving signal and combining the second interference signal with the second receiving signal in order to obtain an improved first receiving signal and an improved second receiving signal in order to obtain an interference reduction; and decoding the improved first receiving signal and the improved second receiving signal and outputting the information word of the plurality of information units based on the improved first receiving signal and the improved second receiving signal.

The present invention is based on the finding that a transmitting device with a redundancy-adding encoder, in order to achieve a forward-error correction, is coupled to two transmitters with spatially different positions, in order to achieve a space diversity, wherein further preferably using an interleaver also a time diversity function is present. According to the invention, both transmitters transmit in the same frequency band using the same carrier frequency. According to the invention, consequently a space diversity with a forward-error correction (through the redundancy-adding encoder) and preferably also a time diversity in the two transmitting devices is achieved by respective interleavers, while still only one frequency band is required in so far that in comparison to the known transmitting/receiving concept only half of the bandwidth is required so that only half of the bandwidth costs result. It is to be noted that the halving of the bandwidth in particular in satellite broadcasting causes substantial cost savings, as the costs for generating a satellite on the one hand and in particular for the transport of the satellite on the other hand, for example to its geostationary position, are substantial. As only half of the bandwidth is required, those costs are halved.

As the transmitting signals of the first and the second transmitter are in the same frequency band, they will overlay at the receiver antenna and cause more or less strong interferences depending on the channel. The inventive receiver concept is therefore implemented such that it synchronizes receiving signals applied to a receiving antenna and samples the same to the first transmitter in order to obtain a first receiving signal, and further samples the same in a synchronized way onto the second transmitter in order to obtain a second receiving signal. Both receiving signals are interfered with by interferences of the respectively other transmitter. For reducing or eliminating this interference, respectively, the two receiving signals are decoded in order to retrieve received code units that the redundancy-adding encoder generated in the transmitter. From these code units interference signals in the receiver are calculated and—in an iterative loop with one or several iteration steps—subtracted from the two receiving signals in order to obtain an interference reduction. The interference-reduced receiving signals, i.e. the improved receiving signals, are then again fed to the decoder in order to retrieve the information word underlying the code units on the base of the interference-reduced receiving signals. To this end, a controller is provided, which on the one hand controls the iteration and on the other hand determines whether a termination criterion of the iteration is determined.

In a preferred embodiment of the present invention, a redundancy-adding encoder with a code rate $R_c$ of ¼ is used which generates four code units from one information unit. These code units are then separated into two subgroups of code units, so that the first transmitter obtains two code units and the second transmitter also obtains two code units. Respective interleavers in the two transmitting branches provide a time diversity function which is in particular advantageous with burst errors, like e.g. deep fades. Each transmitter further includes a QPSK mapper to perform a QPSK modulation. In other words, two code units are grouped at the output of an interleaver, whereupon a QPSK symbol is associated with this 2 code unit group which is then shifted onto a carrier frequency and transmitted by the transmitter. In the receiver, below the conventional receiver front end including an antenna and a down-conversion means, a demapper is provided in order to recover the two code units from a received QPSK symbol.

In a preferred embodiment of the present invention, the demapper is implemented as a soft demapper, such that it does not perform any hard decision but provides probabilities that a code unit is a 0 or a 1. After the demapper the code units which are present as probabilities are again fed to a de-interleaver which cancels the code unit interleaving in the transmitter. The "de-interleaved" code unit probabilities are then fed to a soft-in-soft-out decoder which is preferably implemented as a BCJR-SISO decoder. The probabilities for code units from both receiving branches are fed to the SISO decoder, i.e. as pre-decoding probabilities.

The SISO decoder provides post-decoding probabilities for the individual encoding units at the output side which are used in order to estimate the interference signals. To this end, the post-decoding probabilities are again interleaved as in the transmitter and fed to estimating means in order to "softly" estimate the transmitted QPSK symbols from the code unit probabilities.

The estimated QPSK symbols are then provided with a transmission channel characteristic in the receiver which is obtained by conventional channel-estimating methods in order to obtain interference signals which are finally "crossedly" subtracted by the receiving signals. In particular, the interference signal which was calculated on the basis of the second receiving signal is subtracted from the first receiving signal while the interference signal which was calculated on the basis of the first receiving signal is subtracted from the second receiving signal so that improved first and second receiving signals are obtained which are again processed like the "original first and second receiving signals" in order to again calculate post-decoding probabilities using which a further iteration loop may be entered.

In a preferred embodiment of the present invention, further, not a conventional soft demapper is used but a special soft demapper which performs an improved demapping decision using page information. To this end, from the post-decoding probabilities at the output of the SISO decoder a set of extrinsic decoding probabilities is calculated which are also fed to the demapper in a branch as page information after a corresponding interleaving processing in order to consider a rotation-variant distortion in the sample value due to the interference reduction.

The inventive receiver concept has the advantage that it enables the use of a transmitting device, wherein both transmitters operate in the same frequency band, so that compared to prior concepts only half of the bandwidth of the transmission channel is required. By the iterative interference reduction using a channel decoder which is preferably an SISO decoder and in particular a BCJR decoder, the interference at the receiving antenna is reduced, which would generally prohibit a transmitting concept with two transmitters transmitting on identical frequencies. As components in the receiver may be used several times, i.e. for each iteration loop, the effort in the receiver is limited and lower with regard to cost and size than a transmitting/receiving concept with a doubled bandwidth.

A further advantage of the inventive concept is the fast convergence. Already after the first iteration step substantial interference reductions are obtained. Already after only between four and six iteration steps from one iteration to the other iteration only a minimum change in the decoded code units is determined, so that a fast convergence is guaranteed.

A further advantage of the present invention is that any processing may be performed in the base band so that no high-effort and expensive digital circuits or even analog circuits are required in order to perform an interference reduction for example in the ZF band or in the RF band, although this is basically also possible.

A further advantage of the present invention is that generally known modules may be used, i.e. FEC encoders and QPSK mappers in the transmitter and QPSK demapper, estimating means and trellis decoders in the receiver matching the FEC encoder in the transmitter.

BRIEF DESCRIPTION OF THE DRAWINGS

These and other objects and features of the present invention will become clear from the following description taken in conjunction with the accompanying drawings, in which:

FIG. 9 shows the transmitting function of the demapper as a function of real and imaginary parts for samples of a receiving signal with a non-circular distortion when the pre-demapping probabilities for I and Q are different;

FIG. 10 shows the probability density function of received samples for the demapping function of FIG. 11.

DESCRIPTION OF THE PREFERRED EMBODIMENTS

Figure 1:
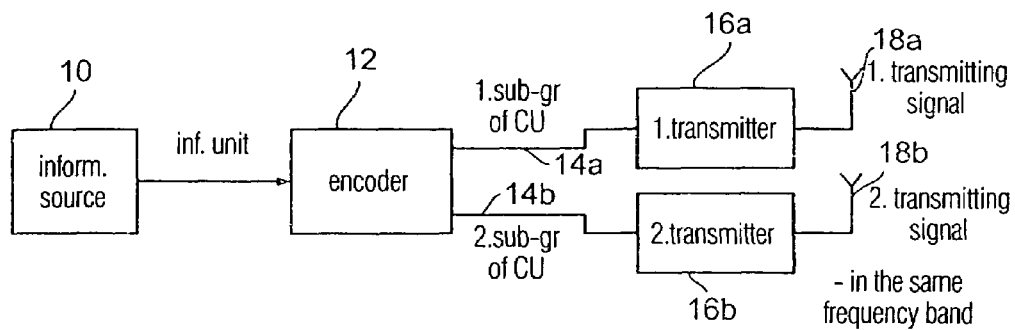
FIG. 1 shows a block diagram of an inventive transmitting device.

FIG. 1 shows a schematic illustration of an inventive transmitter. An information source 10 provides an information word u with a plurality of information units. This information word is fed into a redundancy-adding encoder 12 having a code rate smaller or equal to ½. From the information word through the FEC encoder 12 a plurality of code units are generated, wherein the encoder 12 is further operable in order to separate the plurality of code units into two subgroup of code units. A first subgroup of code units is fed at a first output line 14a of the encoder to a first transmitter 16a, while the second subgroup of code units is provided at a second output line 14b of the encoder to a second transmitter 16b. The first transmitter 16a is connected to a first transmitting antenna 18a in order to emit a first transmitting signal, while the second transmitter 16b is connected to a second transmitting antenna 18b in order to emit a second transmitting signal. In order to obtain a space diversity function, the first and the second transmitter are arranged in different spatial positions. According to the invention, however, both transmitters transmit in the same frequency band, so that the first transmitting signal and the second transmitting signal are superposed in the free space. The two transmitters are preferably satellites arranged at different geostationary positions, while a receiver is for example a broadcasting receiving device in a moving vehicle.

Figure 2:
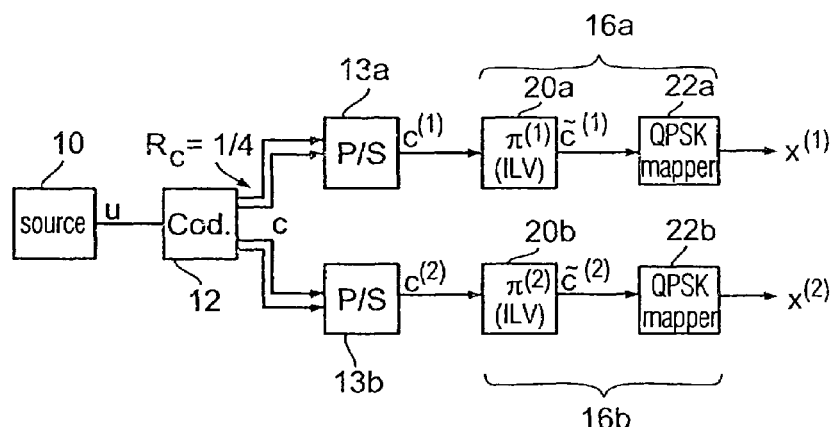
FIG. 2 shows a preferred embodiment of a transmitting device.

Among others, FIG. 2 shows a preferred embodiment of the inventive transmitters of FIG. 1. In particular, it is preferred to use an encoder with a code rate $R_c$ of ¼ as an encoder 12, such that from one information word u with a plurality of information units a plurality of code units is generated which are smaller or equal to four times the plurality of information units. The plurality of code units represent a code word c which is separated into two sub-groups or sub-code-words $c^{(1)}$ and $c^{(2)}$. The information word is preferably a binary information word which is channel-coded by the encoder 12 which is implemented as a convolutional encoder and has a given memory v and a rate of $R_c$ equal to ¼. This encoder terminates after the input of K information bits, i.e. after the input of a plurality of information units in the 0 state, which means in other words that v "lagging" terminating bits are inserted. Thus, the encoder outputs a codeword $c=(c_0, \ldots, c_{N-1})$, consisting of $\tilde{K}=K+v$.

For every input bit $u_k$ the encoder thus generates four code bits $c_n$ which are separated in the parallel/serial converters 13a, 13b into the subgroups or sub-code-words of the length N/2 for the first transmitter 16a or the second transmitter 16b, respectively. Each transmitter includes an interleaver 20a or 20b, respectively. These two interleavers (ILV) are preferably implemented as s-random interleavers in order to perform a permutation, like they are described in S. Dolinar and D. Divsaler, "Weight Distributions for Turbo Codes Using Random and Nonrandom Permutations", JPL-TDA Progress Report, Vol. 42-122, pp. 56-65, 1995. The two bit interleavers 20a, 20b permutate the vectors $c^{(1)}$ and $c^{(2)}$. Finally, pairs of successive bits are converted in the permutated sub-code-words or subgroups, respectively, of code units into QPSK symbols using the QPSK mappers 22a, 22b. (QPSK=Quaternary Phase Shift Keying). In the preferred embodiment shown in FIG. 2 of the present invention a Gray mapping is used as a mapping specification, wherein the following conventions apply:

1 a pair of successive code units with "11": 45° pointer in the first quadrant of the complex level;

2 a pair of successive code units with "10": 135° pointer in the second quadrant of the complex level;

3 a pair of successive code units with "00": 225° pointer in the third quadrant of the complex level; and 4 a pair of successive code units with "01": 315° pointer in the fourth quadrant of the complex plain.

The Gray mapping is advantageous in so far that one bit of a pair of permutated code bits stand for the imaginary part and the other bit stands for the real part.

The two QPSK mappers 22a, 22b provide vectors $x^{(1)}$ and $x^{(2)}$ of QPSK symbols at the output side, whose length is equal to N/4=K, wherein, as it has already been discussed, the vectors of QPSK symbols are transmitted in the same frequency band by the transmitters or satellites 1 and 2, respectively (16a or 16b, respectively). To this end, any known transmitter front end is provided, which for example performs a complex modulation and an upward mixing onto a carrier frequency with the QPSK symbols.

The simplest way to obtain a space diversity for the transmitters is to have an encoder with a rate $R_c$ of ½ and to duplicate the code words with same, which causes that the first subgroup of code units and the second subgroup of code units are identical so that also an overall code rate of ¼ is obtained. The same code bits are therefore transmitted twice, wherein due to the interleaver in the two branches the vector $\tilde{c}^{(2)}$ in the satellite is a simple permutated version of the corresponding sub-code-words for the first satellite.

According to the invention, it is preferred, however, to use a real code with a code rate of ¼ instead of a simple repetition code, as a real code with a code rate of ¼ provides a higher power efficiency than a simple repetition code, as the generation of additional code bits instead of the simple duplicating of the same leads to a higher code diversity.

In a preferred embodiment of the present invention, the memory of the convolutional encoder ν is equal to 6. The generator polynomials for a code with a maximum free distance for $R_c$=¼ in an octal illustration are ($135_8$, $147_8$, $135_8$, $163_8$). It is to be noted, that the last two polynomials are mirrored versions of the first two polynomials. For this reason, it is preferred that the first two polynomials are associated with the generation of the code bits for the first satellite, while the last two polynomials are used for the satellite 2. Thus, the transmissions via both satellites have an identical power efficiency. If only one satellite is regarded, then the minimum distance of the code is equal to 10, which is optimal for $R_c$=½ and ν=6. When sub-code-words (sub-groups of code units) for both satellites are combined, then their minimum distance is equal to 20.

As, according to the invention, both satellites transmit in the same frequency band, the overall transmission rate is R=1. In practice, the overall rate is a bit smaller due to the additional symbols because of the termination of the convolution encoder. In particular, regarded in numbers, from one information unit four code units are generated, wherein then again two code units each are grouped into two QPSK symbols (from transmitter 1 and from transmitter 2), so that again regarded in numbers from one information unit two QPSK symbols are generated. After the two QPSK symbols of the two transmitters are transmitted on the same frequency, for each information unit one transmitting process at a single point of time and at the same frequency (using both transmitters, however) is performed, so that according to the convention an overall code rate of 1 or somewhat smaller than 1 results, respectively, as it was implemented above.

Figure 3:
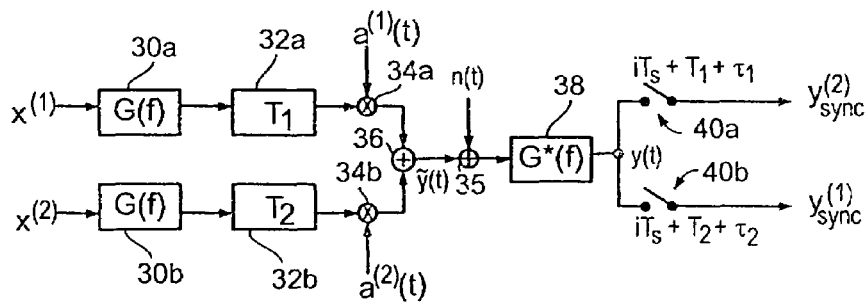
FIG. 3 shows a base band model of a time-continuous transmission.

In the following, using FIG. 3, reference is made to the equivalent baseband model of the transmission in the continuous space. Using a transmitting filter G(f) 30a, 30b, the QPSK-mapped vector $x^{(1)}$ or $x^{(2)}$, respectively, of the two transmitters 16a, 16b is pulse-amplitude-modulated. For the following explanation it is assumed that the transmitting filter is a square root Nyquist filter for a symbol duration Ts with a real-value impulse response g(t). The fraction of the propagation delay between the transmitter and the receiver is $T_1 \in [-0.5 \times T_s; 0.5 \times T_s]$. It is further assumed, that the integral part of the propagation delay may be accurately estimated by suitable measures. This integral part is therefore ignored for reasons of simplicity of illustration, by assuming that it is always 0. On its way through the atmosphere, the transmitting signal typically experiences a flat Rice-fading in frequency with a slowly time-varying fading coefficient $a^{(1)}(t)$. The satellite (2) uses the same transmitting filter G(f) 30b, wherein, however, the fraction of its propagation delay to the receiver is $T_2 \in [-0.5 \times T_s; 0.5 \times T_s]$. Also for the second satellite a second slow and flat Rice fading process in frequency is prepared which is statistically independent of the first fading process. The signals of both satellites are combined at the receiving antenna of the inventive receiving device, as it is illustrated by a summer 36 in FIG. 3. The two filters 30a, 30b therefore represent the impulse formation in the transmitter, while the two time-delay elements 32a, 32b model the run time of the signal from the first transmitter to the receiver or the run time of the signal from the second transmitter to the receiver, respectively.

The channel fading is modeled by the multipliers 34a, 34b, while the receiver practically starts from the summer 36, as the summer 36 models the superposition of the two transmitting signals at the receiving antenna of the inventive receiving device. The receiving signal ỹ(t) at the output of the summer 36 may be illustrated as follows in an equation:

$$\tilde{y}(t) = a^{(1)}(t) \cdot \sum_k x^{(1)}[k] \cdot g(t - kT_s - T_1) + a^{(2)}(t) \cdot \sum_k x^{(2)}[k] \cdot g(t - kT_s - T_2) \quad (1)$$

In addition to the summation that is performed by the receiving antenna, the same also adds Gaussian noise (WGN) with a unilateral spectral power density $N_0$. The received signal is then filtered by use of a receiver impulse formation filter 38 with a transmission function G*(f), so that the output signal at this receiving filter 38 is defined as follows in an equation:

$$y(t) \approx a^{(1)}(t) \cdot \sum_k x^{(1)}[k] \cdot \phi_{gg}(t - kT_s - T_1) + a^{(2)}(t) \cdot \sum_k x^{(2)}[k] \cdot \phi_{gg}(t - kT_s - T_2) + n(t) \quad (2)$$

In this equation, $\phi_{gg}(t)$ is the auto-correlation function of g(t). In the following it is assumed that g(t) is normalized, so that $\phi_{gg}(0)=1$ holds true. The process n(t) whose superposition onto the receiving signal is illustrated symbolically by an adder 35, illustrates the filtered noise ñ(t), whose power is given as follows:

$$\sigma_n^2 N_0/T_s \quad (3)$$

As it is implemented in more detail later, the receiver now tries to respectively synchronize to one corresponding satellite in two branches, so that the output signal of the receiver filter 36a is sampled at the times $i \times T_s + T_1 + \tau_1$, in order to obtain a time-discrete signal for the satellite 1. Analog to this, at times $i \times T_s + T_2 + \tau_2$ a sampling operation is performed, in order to obtain a time-discrete signal $y_{sync}^{(2)}$ for the satellite 2. Here, $\tau_1$, $\tau_2$ illustrate the error of the symbol clock recovering for the two satellites, i.e. the synchronization of a first sampler 40a and a second sampler 40b. Without a limitation of the general view it may be assumed, that $\tau_1$, $\tau_2$ are much smalls than $T_s$, i.e. the symbol time duration. Therefore, the two time-discrete samples for every symbol interval are defined as follows:

$$y_{sync}^{(1)}[j] \approx a^{(1)}(jT_s) \cdot \sum_k x^{(1)}[k] \cdot \phi_{gg}((j-k)T_s + \tau_1) + \quad (4)$$

$$a^{(2)}(jT_s) \cdot \sum_k x^{(2)}[k] \cdot \phi_{gg}((j-k)T_s + T_1 - T_2 + \tau_1)$$

$$y_{sync}^{(2)}[j] \approx a^{(1)}(jT_s) \cdot \sum_k x^{(1)}[k] \cdot \phi_{gg}((j-k)T_s + T_2 - T_1 + \tau_2) + \quad (5)$$

$$a^{(2)}(jT_s) \cdot \sum_k x^{(2)}[k] \cdot \phi_{gg}((j-k)T_s + \tau_2)$$

Figure 4:
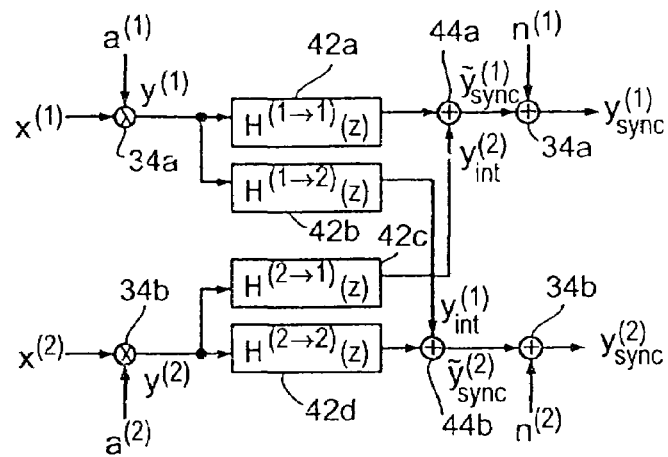
FIG. 4 shows a schematic block diagram for illustrating a time-discrete transmission.

In the following, for reasons of illustration, the time-continuous transmission model is replaced by a time-discrete transmission model, as it is illustrated in FIG. 4. The transmission delays $T_1$, $T_2$ (32a, 32b) of FIG. 3 are modeled into four filters 42a-42d illustrated in FIG. 4 together with possible synchronization errors of the samplers 40a, 40b.

The QPSK symbols in the vector $x^{(1)}$ are multiplied with the respective elements of the vector $a^{(1)}$ which corresponds to the Rice fading process which is slow and flat in frequency. Analog to that, the elements of $x^{(2)}$ are multiplied with the fading coefficients in $a^{(2)}$ element-wise. The resulting vectors $y^{(1)}$ and $y^{(2)}$ are then filtered with the four filters 42a-42d, as it is shown in FIG. 4. The respective impulse responses of these filters are as follows:

$$h^{(1 \to 1)}[1] = \phi_{gg}(1T_s + \tau_1) \quad (6)$$

$$h^{(2 \to 1)}[1] = \phi_{gg}(1T_s + T_1 - T_2 + \tau_1) \quad (7)$$

$$h^{(1 \to 2)}[1] = \phi_{gg}(1T_s + T_2 - T_1 + \tau_2) \quad (8)$$

$$h^{(2 \to 2)}[1] = \phi_{gg}(1T_s + \tau_2) \quad (9)$$

For the following considerations, it is assumed for reasons of simplicity, that the propagation delay $T_1$, $T_2$ during the transmission of one information word is constant, that, however, the synchronization errors $\tau_1$, $\tau_2$ during the transmission may slowly vary, so that indeed sequences $\tau_1[j]$, $\tau_2[j]$ may occur.

The filtering of $y^{(1)}$ with $H^{(1 \to 1)}(z)$ or $y^{(2)}$ with $H^{(2 \to 2)}(z)$ considers the possibly non-optimum conformance between the estimated and the actual symbol phase, i.e. accommodates errors in the synchronization of the samplers 40a, 40b on the first transmitter or the second transmitter, respectively. When the phases are estimated correctly, i.e. when an optimum synchronization is present and $\tau_1 = \tau_2 = 0$, then the transmission functions of these filters are equal to 1.

The filters $H^{(2 \to 1)}(z)$ and $H^{(1 \to 2)}(z)$ represent the interference of the signal of the satellite in the samples which were sampled in a synchronized way on the satellite 1, and vice versa. These filters are mainly determined by the difference $T_1 - T_2$ of the propagation delay of both satellites to the receiving device. The output signals of these filters are the vectors $y_{int}^{(2)}$, and $y_{int}^{(1)}$ of the interference samples.

The output signals of these filters thus represent the interference signals which occur during the actual transmission, as it is implemented later, which are estimated by the inventive receiving device in order to perform an interference reduction with the estimated interference signals in the iterative receiving method according to the present invention.

The superposition of the interference signals to the "useful signals" is symbolized in FIG. 4 by the adders 44a, 44b. At the output of the adders 44a, 44b, therefore—however, in a time-discrete illustration—the same signals are applied as at the output of the samplers 40a, 40b of FIG. 3, however, without the white noise of the receiving antenna which is added by the adders 34a, 34b. For a simplification it may be assumed, that the noise vectors $n^{(1)}$ and $n^{(2)}$ are not correlated with each other and that the variance of all noise samples is $\sigma_n^2 N_0 / T_s$. At the output of the adders 34a, 34b therefore a first receiving signal $y_{sync}^{(1)}$, which is the receiving signal of the first transmitter disturbed by the interference, and a second receiving signal $y_{sync}^{(2)}$, which is the receiving signal disturbed by the interference and synchronized to the second transmitter.

In the following, an inventive receiving device is described with reference to the block diagram shown in FIG. 5. The receiving device includes a receiving antenna 50 and any known receiver front end 52 in order to arrange for a conversion of the RF receiving signal of the antenna 50 into the baseband. The output signal of the receiver front end 52 is fed to a sampling means 40 which includes the first sampler 40a and the second sampler 40b. The first sampler 40a is controlled with regard to its sample times by use of a synchronization signal 41a in order to achieve a sampling synchronized to the first transmitter 16a of FIG. 1. Analog to that, the second sampler is controlled by a synchronization signal 41b in order to obtain a sampling of the receiving signal synchronized to the second transmitter 16b of FIG. 1. At the output of the sampler 40a a first receiving signal is present which is, however, disturbed by interferences of the second transmitter, as it was explained with reference to FIG. 4. Analog to this, at the output of the second sampler a second receiving signal is present, which is, however, disturbed by interferences of the first transmitter.

In a so to speak $0^{th}$ iteration pass, the first receiving signal at the output of the first sampler 40a is fed to a decoding means 54. In addition to that, also the second receiving signal is fed into the decoding means 54, in order to provide a first receiving subgroup at first output 56a associated with the first subgroup of code units on line 14a of the transmitting device of FIG. 1. In addition, the decoder 54 provides a second receiving subgroup of code units on the output side on a second output line 56b at the output side, which is associated with the second subgroup of code units on the line 14b of the transmitting device of FIG. 1. It is to be noted, however, that in this above-described "$0^{th}$ iteration path" the receiving subgroup and the second receiving subgroup on lines 56a, 56b do not exactly correspond to the first transmitting subgroup and the second transmitting subgroup of code units, but are disturbed due to the interference which is present, because the first and the second transmitters 16a, 16b of FIG. 1 are transmitting on the same carrier frequency.

According to the invention, the first receiving subgroup and the interference-disturbed second receiving subgroup are fed to a calculating means 58 in order to calculate a first interference signal on the basis of the second receiving subgroup, and in order to calculate a second interference signal on the basis of the first receiving subgroup. Both, the first interference signal and also the second interference signal are fed to an interference reduction means 60 and are subtracted from the first receiving signal at the output of the first sampler or from the second receiving signal at the output of the second sampler, respectively, as it is schematically illustrated by subtractors 60a, 60b in FIG. 1.

A control means 62 is connected to the decoder 54 in order to control the decoding means 54, so that the same decodes an improved first receiving signal output from the interference reduction means 60 and an improved second receiving signal output from the interference reduction means 60 and outputs the information word underlying the receiving signals with the plurality of information units based on the improved first receiving signal and the improved second receiving signal. The controller 62 is further operable in order to decide whether already one iteration is sufficient or whether one or several iteration steps are to follow.

If no further iteration is to be performed, i.e. if a predetermined termination criterion is fulfilled, then directly using the decoded improved first signal and the decoded improved second signal, as it is illustrated by two dashed arrows 55a, 55b, the information word is output with the plurality of information units.

If, however, a further iteration step is to follow, then the first receiving subgroup is determined from the improved first signal and the improved second signal, as it is illustrated by dashed arrows 55b and 55c, and the second receiving subgroup is calculated using the improved first signal and the improved second signal, as it is illustrated by arrows 55e and 55f.

From this, by the calculating means 58 again a now, however, improved first interference signal and an improved second interference signal is determined and again subtracted from the first receiving signal or from the second receiving signal, respectively, in the interference reduction means, in order to determine a further improved first signal and a further improved second signal at the output of the interference reduction means for this iteration step.

If the controller 62 now determines, that the iteration is to be terminated, because the predetermined iteration termination criterion is fulfilled, then the information word is directly decoded and output using the further improved first signal and the further improved second signal. Also for the second iteration the information word is thus calculated directly using the further improved first signal and the further improved second signal, is still determined, however, on the basis of the improved first signal and the improved second signal obtained in the first iteration, as the further improved first signal and the further improved second signal are based on the improved first signal or the improved second signal, respectively.

Figure 5:
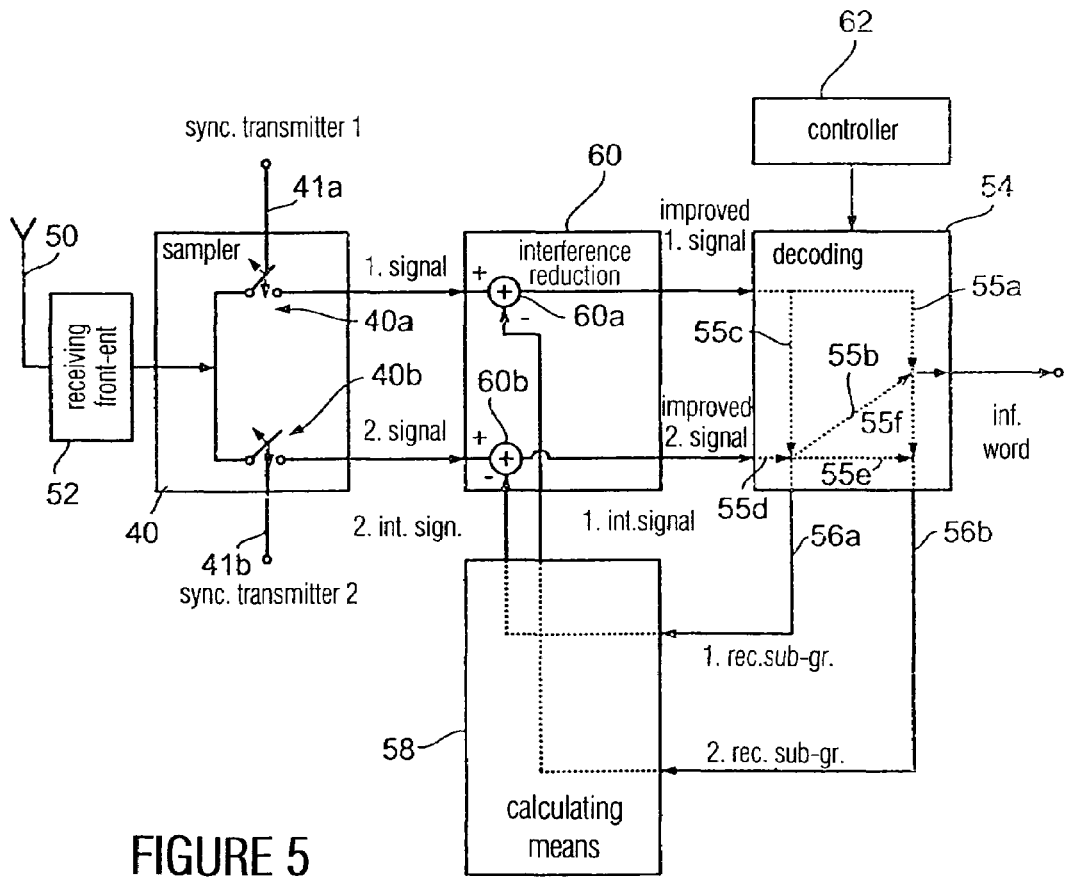
FIG. 5 shows a block diagram of an inventive receiving device.

In the following, with reference to FIG. 6, a preferred embodiment of the receiving device shown in FIG. 5 is illustrated. Like reference numerals indicate like elements. For reasons of clarity, in FIG. 6, in comparison to FIG. 5, the sampler 40 is not shown. The first receiving signal $y_{sync}^{(1)}$ or the second receiving signal $y_{sync}^{(2)}$ are fed into the decoding means 54 in a $0^{th}$ iteration path at the interference reduction adders 60a, 60b, wherein the decoding means is illustrated in dashed lines in FIG. 6.

Figure 6:
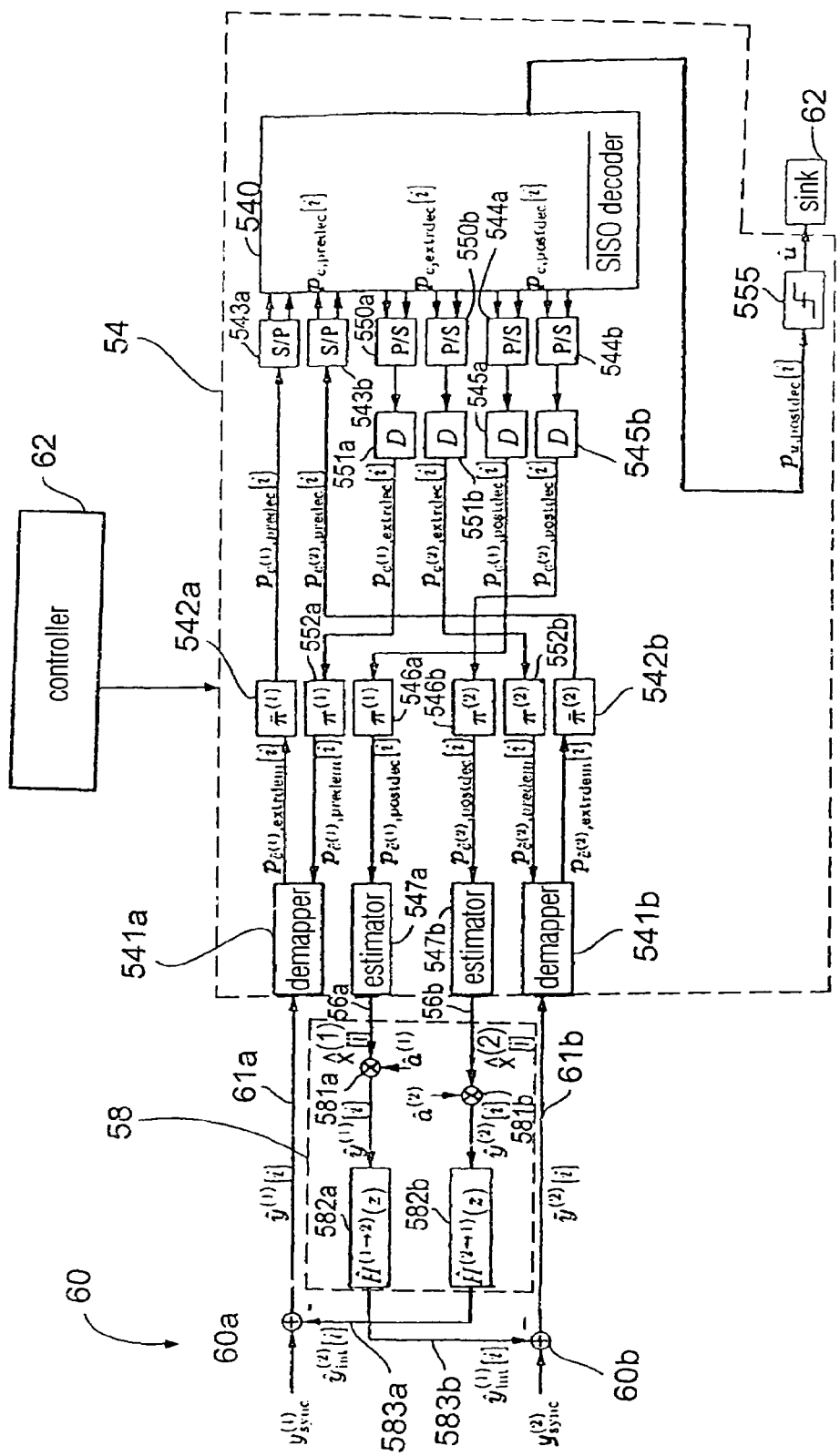
FIG. 6 shows a preferred embodiment of a receiving device having a soft demapper.

The receiver of FIG. 6 is implemented in order to receive and decode receiving signals which were generated on the basis of transmitting signals of the transmitter shown in FIG. 2 and to decode the same. For this purpose, the decoding means 54 includes a demapper 541a, 541b for every receiving branch. The demapper includes complex sample value at the input side, like e.g. voltage values, which are converted into extrinsic demapping probabilities in the demapper 541a, 541b. The complex sample representing a modulation symbol y is therefore converted into two extrinsic demapping probabilities for example by the demapper 541a, wherein the two probabilities stand for whether the two code units which together form the examined QPSK symbol are a 1 or a 0, respectively. The meaning of extrinsic probabilities is discussed in more detail below. Generally it is sufficient to only indicate the probabilities whether a code unit is a 1, as the probability whether the code unit is a 0 directly results from the probability that the code unit is a 1. On the input side a vector of complex samples is fed into the demapper 541a, while on the output side a vector of double the length for probabilities of code units is received.

The vector of extrinsic demodulation probabilities at the output of the demapper 541a or 541b, respectively, is then fed into a de-interleaver 542a or 542b, respectively, in order to cancel permutations (elements 20a, 20b of FIG. 2) performed in the transmitters. At the output of the deinterleavers 542a or 542b, respectively, therefore a vector of pre-decoding probabilities results which has the same length as the vector at the input of means 542a or 542b, respectively.

In a serial/parallel converter two successive components of the vector each are grouped for the pre-decoding probabilities (543a or 543b, respectively). At the output of the serial/parallel converters 543a or 543b, respectively, therefore in the illustrated embodiment the pre-decoding probabilities for the first receiving subgroup of code units (543a) and the second receiving subgroup of code units (543b) are applied.

The first and the second receiving subgroup or, when probabilities are calculated with, the probabilities for the code units in these subgroups are fed into a trellis decoder which is an SISO decoder in the preferred embodiment of the present invention, shown in FIG. 6, which operates according to the BCJR algorithm (BCJR=Bahl Cocke Jelinek Raviv), which is described in detail in "Optimal Decoding of Linear Codes for Minimizing Symbol Error Rate", IEEE Transactions on Information Theory, pp. 284-287, 1974.

A decoder implemented such provides as an example for a soft-in-soft-out decoder a decoded first receiving subgroup of code units, which is fed into a parallel/serial converter 544a, and a decoded second receiving subgroup of code units, which is fed into the parallel/serial converter 544b, in order to make the parallel output of the SISO decoder serial. It is to be noted that instead of the SISO decoder of the BCJR type also other known soft-in-soft-out decoders may be used. In addition to that, it is not important that soft decoders are used at all. Alternatively, also decoders may be used which do not calculate with probabilities but in which already the demapper performs a hard 0/1 decision.

The inventive concept is especially suitable for a soft decoding, however, such that the preferred demapper performs a conversion of samples not into code units as it is but into probabilities for code units. In principle, it is equivalent, however, whether a calculation is performed with the code units as it is or with the probabilities for the code units. Therefore, if nothing different is indicated, in the following, when reference is made to code units, at the same time reference is made to probabilities for code units.

As the interference reduction proceeding is iterative, in FIG. 6 delay elements 545a, 545b are indicated, which are to symbolize that the post-decoding probabilities for the first and second decoded receiving subgroups of code units are only available for a further processing in the next iteration step. The vector of post-decoding probabilities for a certain iteration step i is again subjected to an interleaving operation by use of interleavers 546a, 546b, in order to obtain permutated post-decoding probabilities which are respectively fed into an estimation means designated by estimator in FIG. 6, in order to obtain again complex samples from the probabilities for the first and the second receiving subgroups of code units which basically correspond to the sample at the input in the demapper 541a or 541b, respectively. The output signals at the output of the estimators 547a, 547b therefore again represent complex tetravalent symbols. The estimators may therefore be regarded as "soft" QPSK mappers, however with the difference that the QPSK mappers of FIG. 2 actually obtain bits at the input side while the estimators 547a, 547b in FIG. 6 obtain probabilities for bits at the input side.

The output lines of the estimators 547a, 547b of FIG. 6 therefore correspond to the lines 56a or 56b, respectively, of FIG. 5. The decoder 54, which is in principle illustrated in FIG. 5, therefore contains, when compared to FIGS. 5 and 6, demapping, de-interleaving, SISO decoding, interleaving the post-decoding probabilities and the functionality of the estimators 547a, 547b.

In so far it is equivalent whether the first receiving subgroup of code units is present at the output of the decoding means 54 as a QPSK symbol like in FIG. 6 or, when another modulation is used, as another modulation symbol, or when no modulation is used, as a direct subgroup of code units. It will be obvious for persons skilled in the art, that the type of modulation is not substantial for the inventive interference reduction concept, although the QPSK modulation/demodulation is preferred.

The first and second receiving subgroups of code units output by the decoding means 54 may therefore either be present as a direct receiving subgroup with indeed two or more separated code units or, as it is the case in FIG. 6, as a receiving subgroup of code units, wherein the subgroup is realized as a symbol, however, which depends on the two or more code units of the subgroup, wherein the symbol in FIG. 6 is a "soft" QPSK symbol at the output of the estimator 547a or 547b, respectively.

In the preferred embodiment shown in FIG. 6 the calculating means 58, as it is shown in FIG. 5, includes multipliers 581a, 581b, in order to accommodate the channel fading, i.e. for both branches. In addition to that, the calculating means includes the transmission functions 582a, 582b introduced by the time-discrete illustration, to consider the inter-symbol interferences through the non-synchronism of the interference signal to the receiving signal. In the interference reduction means in which the first interference signal is fed to the adder 60a on a line 583a, while the second interference signal is fed to the second adder 60b on a line 583b, improved first and second receiving signals on the input lines 61a or 61b, respectively, are generated in the decoding means 54.

In the preferred embodiment of the present invention, shown in FIG. 6, the demapper 541a and the demapper 541b are implemented as special demappers, performing the demapping function using page information. The page information is also provided from the SISO decoder and is referred to as extrinsic decoding probabilities $p_{c,extrdec}[i]$ in FIG. 6.

The extrinsic decoding probabilities are determined both for the first branch (1) and for the second branch (2) from the post-decoding probabilities in a way known in the art. The determination of the extrinsic decoding probabilities from the post-decoding probabilities for the first and the second subgroup of code units is known in the art. With regard to this, reference is made to Joachim Hagenauer, Elke Offer and Lutz Papke, "Iterative Decoding of Binary Block and Convolutional Codes", IEEE Trans. Inform. Theory, pages 429-437, 1996.

The extrinsic decoding probabilities are fed to a first parallel/serial converter 550a for the first branch or to a second parallel/serial converter 550b for the second branch and are also, as was described above with reference to the delays 545a, 545b, delayed by means of delay means 551a or 551b, respectively, in order to indicate that this is an iteration loop. The extrinsic decoding probabilities are then permutated in interleavers 552a, i.e. according to the same specification that is also performed in the interleavers 546a or 546b, respectively, or in the interleavers shown in FIG. 2. The permutated extrinsic decoding probabilities which are now, as it is indicated in FIG. 6, referred to as pre-demapping probabilities, are then fed to the demappers 541a, 541b as page information in order to improve the demapping function in comparison to a demapper without page information, in order to finally achieve a better bit error rate at the output of the decoder.

When the controller 62 has determined that an iteration termination criterion is fulfilled, then it will control the SISO decoder 540 in order to output post-decoding probabilities for the individual information units at one output. The post-decoding probabilities are then fed to a threshold value decision unit 555 in order to obtain the decoded information word û which is finally fed into an information sink 62.

In the following, the functioning of the preferred decoding device shown in FIG. 6 is explained in more detail.

From the above indicated equations (4) and (5) it may be seen that very strong interferences of the satellite 2 may occur when the sampler 40 synchronizes (41a) onto the satellite 1 and vice versa. In particular, the impulse responses $h^{(2 \rightarrow 1)}[1]$ and $h^{(1 \rightarrow 2)}[1]$ may be very long when generating the interference signal. According to the invention, thus the interference signal is estimated and combined to the corresponding receiving signal in order to obtain an interference reduction by means 60. It is remarkable that the complexity of the inventive technique is almost independent of the length of the impulse response of the interference-generating signal.

As it was already explained above, the decoder 540 of FIG. 6 is implemented as a soft-in/soft-out channel decoder (SISO decoder) which preferably uses the BCJR algorithm in order to obtain so-called soft estimates for the interference signal. Alternatively, any other trellis decoder can be used which may decode the first and the second receiving signal in order to obtain a first receiving subgroup of code units associated with the first transmitting subgroup of code units and a second receiving subgroup of code units associated with the second transmitting subgroup of code units. Preferably, any SISO decoder is used which may provide post-decoding probabilities for the first and the second receiving subgroups from the pre-decoding probabilities for the first and the second receiving subgroups.

In particular, in an iteration step i of the receiver iteration, the output of the decoder of the $(I-1)^{th}$ iteration for the interference reduction is used. With regard to the notation of this application it is to be noted that the last index of a variable used for the receiver indicates the iteration in which the variable was calculated. It is assumed that the channel decoder calculated post-decoding probabilities in the iteration i−1, wherein $p_{c,postdec}[k][i-1]$ illustrates the probability that the transmitted code bit $c[k]$ is equal to 1. For reasons of illustration, without a limitation of the general view, however, in the following the probability of an event is always regarded in so far that the respective bit is a logical 1.

The SISO decoder has further calculated the associated extrinsic probabilities $p_{c,extrdec}[i-1]$ for the bits in the code word c. In the same way as in the encoder, both the post-decoding probabilities and the extrinsic probabilities are separated into two streams or subgroups, respectively, and converted parallel/serial, so that the vectors $p_{c^{(1)},postdec}[i]$ and $p_{c^{(2)},postdec}[i]$ of the post-decoding probabilities for the bits in the code words $c^{(1)}$ and $c^{(2)}$ of the satellites 1 or 2, respectively, are obtained. The same is obtained for the associated extrinsic probabilities, so that corresponding vectors with extrinsic probabilities result. Both vectors are permutated by the corresponding interleaver illustrated in FIG. 6.

The notation $p_{\tilde{c}^{(1)},predem}[i]$ and $p_{\tilde{c}^{(2)},predem}[i]$ was used, as these extrinsic probabilities, which were calculated by the decoder, are used as pre-demapping probabilities. The post-decoding probabilities for the permutated code bits may be used now in order to reconstruct the vectors $x^{(1)}$ and $x^{(2)}$ of the transmitted QPSK symbols.

As the decoder may not reliably identify all transmitted code symbols $c_k$, soft estimates $\hat{x}^{(1)}[i]=(\hat{x}^{(1)}[0][i], \ldots, \hat{x}^{(1)}[\tilde{K}-1][i])$ and $\hat{x}^{(2)}[i]=(\hat{x}^{(2)}[0][i], \ldots, \hat{x}^{(2)}[\tilde{K}-1][i])$ of the vectors $x^{(1)}$ and $x^{(2)}$ are used in which the reliability of the output of the decoder is considered. In order to minimize the estimation error with regard to the MMSE (MMSE=Minimum Mean Squared Error), the soft estimation values are calculated as follows:

$$x^{(1)}[i] = E[x^{(1)} \mid p_{\tilde{c}^{(1)},postdec}[i]] \quad und \qquad (10)$$

$$x^{(2)}[i] = E[x^{(2)} \mid p_{\tilde{c}^{(2)},postdec}[i]] \qquad (11)$$

Here, $E[x^{(1)}|p_{\tilde{c}^{(1)},postdec}[i]]$ indicates the expectation value for $x^{(1)}$, while the vector $p_{\tilde{c}^{(1)},postdec}[i]=(p_{\tilde{c}^{(1)},postdec}[0][i], \ldots, p_{\tilde{c}^{(1)},postdec}[N/2-1][i])$ contains the probabilities that the following holds true for the permutated code bit: $\tilde{c}^{(1)}[k]=1$ for $k=0, \ldots, N/2-1$.

These soft estimates calculated by the estimator 547a or 547b, respectively, may now be used in order to reduce the interference in the vectors from samples $$y^{(1)}_{sync} \text{ and } y^{(2)}_{sync}$$

for the signals synchronized on the two satellites. For this purpose, first of all the interference signals $y_{int}^{(1)}$ and $y_{int}^{(2)}$ are reconstructed by multiplying $\hat{x}^{(1)}[i]$ or $\hat{x}^{(2)}[i]$ element-wise by the estimated fading coefficients $\hat{a}^{(1)}$ or $\hat{a}^{(2)}$. Then, the obtained results $\hat{y}^{(1)}[i]$ and $\hat{y}^{(2)}[i]$ are respectively filtered with $\hat{H}^{(1\rightarrow 2)}(z)$ and $\hat{H}^{(2\rightarrow 1)}(z)$. These filters represent the estimates of the receiver for the filters $H^{(1\rightarrow 2)}(z)$ and $H^{(2\rightarrow 1)}(z)$, which are responsible for the interference in the time-discrete transmission model shown in FIG. 4. Thus, these filters have the following impulse responses:

$$\hat{h}^{(1\rightarrow 2)}[1]=\phi_{gg}(1T_s+T_2-T_1+\tau_2-\tau_1) \qquad (12)$$

$$\hat{h}^{(2\rightarrow 1)}[1]=\phi_{gg}(1T_s+T_1-T_2+\tau_1-\tau_2) \qquad (13)$$

As the impulse response $g(t)$ of the transmitting filter is real-valued, the following holds true: $\phi_{gg}(-t)=\phi_{gg}(t)$. It further holds true: $\hat{h}^{(2\rightarrow 1)}[1]=\hat{h}^{(1\rightarrow 2)}[-1]$ and correspondingly $\hat{H}^{(2\rightarrow 1)}(z)=\hat{H}^{(1\rightarrow 2)}(1/z)$. The output signals $$\hat{y}^{(1)}_{int}[i] \text{ and } \hat{y}^{(2)}_{int}[i]$$

of the two filters, i.e. the estimates for the interference signals $y_{int}^{(1)}$ and $y_{int}^{(2)}$, may now be subtracted from the receiving signals $y_{sync}^{(1)}$ and $y_{sync}^{(2)}$, which are synchronized to the two satellites.

If the estimation for the interference was perfect, the resulting vectors $\tilde{y}^{(1)}[i]=(\tilde{y}^{(1)}[0][i], \ldots, \tilde{y}^{(1)}[\tilde{K}-1][i])$ and $\tilde{y}^{(2)}[i]=\tilde{y}^{(2)}[1][i], \ldots, \tilde{y}^{(2)}[\tilde{K}-1][i])$ would have no interference. In this case and with a perfect synchronization or symbol time recovering, respectively, i.e. $\tau_1=\tau_2=0$, the overall relative energy $E_s[j]$ of the information-carrying part of the $j^{th}$ pair of samples $\hat{y}^{(1)}[j][i], \hat{y}^{(2)}[j][i]$ would be defined as follows:

$$E_s[j]=\sigma^2_x \cdot (|a^{(1)}[j]|^2+|a^{(2)}[j]|^2) \cdot T_s \qquad (14)$$

Here, $\sigma_x^2$ is the variance of the QPSK constellation in the transmitter.

If, however, the varying reliability of the output signals of the decoder is considered, a residual interference still exists in the vectors $\tilde{y}^{(1)}$ and $\tilde{y}^{(2)}$. As it is described in Ralf R. Müller and Johannes B. Huber "Iterated Soft-Decision Interference Cancellation for CDMA", Broadband Wireless Communications, Pupolin Luise, pp. 110-115, Springer-Verlag, 1998, the variance $$(\sigma^{(1)}_{int}[j][i])^2$$

of the residual interference in a sample $\tilde{y}^{(1)}[j][i]$ of $\tilde{y}^{(1)}[i]$ is calculated as follows:

$$(\sigma^{(1)}_{int}[j][i])^2 \approx |a^{(2)}[j]|^2 \cdot \sum_{l=-L}^{L} |h^{(2\rightarrow 1)}[-1]|^2 \cdot (\sigma_x^2 - |\hat{x}^{(2)}[j+1][i]|^2) \qquad (15)$$

Here, 2L+1 is the approximated length of the filter $H^{(2\rightarrow 1)}(z)$. It is to be noted that the receiver $$(\sigma^{(1)}_{int}[j][i])^2$$

may estimate, when $a^{(2)}[j]$ and $h^{(2\rightarrow 1)}(l)$ are replaced by the respective estimates $\hat{a}^{(2)}[j]$ and $\hat{h}^{(2\rightarrow 1)}[1]$.

In the following, the demapper 541a or 541b of FIG. 6 is explained in more detail. The overall power of the average-free distortion $d^{(1)}[j][i]$, which is present in a sample $\tilde{y}^{(1)}[j][i]$ is the sum of the residual interference power $$(\sigma^{(1)}_{int}[j][i])^2$$

and the noise power $\sigma_n^2$. The complex random variable $d^{(1)}[j][i]=d_I^{(1)}[j][i]+jd_Q^{(1)}[j][i]$ is not circular. In this connection, reference is made to Bernard Picinbono, "On circularity", IEEE Transactions on Signal Processing, Vol. 42, pp. 3473-3482, 1994. The same has actually a non-Gaussian distribution. For reasons of simplicity, however, $d^{(1)}[j][i]$ is modeled as a two-dimensional real Gaussian random variable $$d^{(1)}[j][i] \triangleq [d_I^{(1)}[j][i] \, d_Q^{(1)}[j][i]]^T$$

in the receiver, i.e. with the same performance as $d^{(1)}[j][i]$. The optimum demapper with page information is based on this assumption. The sign $\bullet^T$ indicates the transposition operator. The probability density function (pdf) $f_{d^{(1)}[j][i]}(d^{(1)}[j][i])$ is therefore indicated as follows:

$$f_{d^{(1)}[j][i]}(d^{(1)}[j][i]) = \frac{1}{2\pi\sqrt{(\sigma_{d^{(1)},I}[j][i])^2 \cdot (\sigma_{d^{(1)},Q}[j][i])^2 - (\sigma_{d^{(1)},IQ}[j][i])^4}} \cdot \exp\left(-\frac{d^{(1)}[j][i]^T \cdot \begin{bmatrix} (\sigma_{d^{(1)},Q}[j][i])^2 & -(\sigma_{d^{(1)},IQ}[j][i])^2 \\ -(\sigma_{d^{(1)},IQ}[j][i])^2 & (\sigma_{d^{(1)},I}[j][i])^2 \end{bmatrix} \cdot d^{(1)}[j][i]}{2\left((\sigma_{d^{(1)},I}[j][i])^2 \cdot (\sigma_{d^{(1)},Q}[j][i])^2 - (\sigma_{d^{(1)},IQ}[j][i])^4\right)}\right) \quad (16)$$

The variances $(\sigma_{d^{(1)},I}[j][i])^2$ and $(\sigma_{d^{(1)},Q}[j][i])^2$ of the two components $d_I^{(1)}[j][i]$ and $d_Q^{(1)}[j][i]$ and the covariance $(\sigma_{d^{(1)},IQ}[j][i])^2$ between the same may be calculated as follows:

$$(\sigma_{d^{(1)},I}[j][i])^2 = \sum_{l=-L}^{L} \left[ (\Re(a^{(2)}[j] \cdot h^{(2 \to 1)}[-1]))^2 \cdot \right. \quad (17)$$
$$\left(\sigma_x^2/2 - (\Re(\hat{x}^{(2)}[j+1][i]))^2\right) +$$
$$(\Im(a^{(2)}[j] \cdot h^{(2 \to 1)}[-1]))^2 \cdot$$
$$\left. \left(\sigma_x^2/2 - (\Im(\hat{x}^{(2)}[j+1][i]))^2\right)\right] + \sigma_n^2/2$$

$$(\sigma_{d^{(1)},Q}[j][i])^2 = \sum_{l=-L}^{L} \left[ (\Re(a^{(2)}[j] \cdot h^{(2 \to 1)}[-1]))^2 \cdot \right. \quad (18)$$
$$\left(\sigma_x^2/2 - (\Im(\hat{x}^{(2)}[j+1][i]))^2\right) +$$
$$(\Im(a^{(2)}[j] \cdot h^{(2 \to 1)}[-1]))^2 \cdot$$
$$\left. \left(\sigma_x^2/2 - (\Re(\hat{x}^{(2)}[j+1][i]))^2\right)\right] + \sigma_n^2/2$$

$$(\sigma_{d^{(1)},IQ}[j][i])^2 = \sum_{l=-L}^{L} \Re(a^{(2)}[j] \cdot h^{(2 \to 1)}[-1]) \cdot \quad (19)$$
$$\Im(a^{(2)}[j] \cdot h^{(2 \to 1)}[-1]) \cdot$$
$$\left((\Im(\hat{x}^{(2)}[j+1][i]))^2 - (\Re(\hat{x}^{(2)}[j+1][i]))^2\right)$$

Here, $\Re(\bullet)$ and $\Im(\bullet)$ represent the real and the imaginary part of the corresponding variable.

For reasons of simplicity of the notation it is assumed that the mapping in the transmitter is illustrated by a pair ($\tilde{c}^{(1)}[2j+1], \tilde{c}^{(1)}[2j]$) of successive bits in the code word $\tilde{c}^{(1)}$ in a complex-valued QPSK symbol by $X(\tilde{c}^{(1)}[2j+1], \tilde{c}^{(1)}[2j])$. From the above indicated probability density function PDF of the distortion $d^{(1)}[j][i]$ in a sample $\tilde{y}^{(1)}[j][i]$ and using the additional page information given by the pre-demapping probabilities $p_{\tilde{c}^{(1)}, predem}[i]$ the following quantity is defined which corresponds to the connected pdf of transmitting the QPSK signal point which corresponds to the code bit pair ($\tilde{c}^{(1)}[2j+1], \tilde{c}^{(1)}[2j]$), and receiving the sample $\tilde{y}^{(1)}[j][i]$:

$$\Lambda^{(1)}\begin{pmatrix} \tilde{c}^{(1)}[2j+1], \\ \tilde{c}^{(1)}[2j] \end{pmatrix}[j][i] \triangleq pdf\begin{pmatrix} \tilde{y}^{(1)}[j][i], \tilde{c}^{(1)}[2j+1], \\ \tilde{c}^{(1)}[2j] \end{pmatrix} p_{\tilde{c}^{(1)}, predem}[i]\end{pmatrix} = \quad (20)$$
$$f_{d^{(1)}[j][i]}\begin{pmatrix} \Re\left(\tilde{y}^{(1)}[j][i] - \hat{a}^{(1)}[j] \cdot X(\tilde{c}^{(1)}[2j+1], \tilde{c}^{(1)}[2j])\right) \\ \Im\left(\tilde{y}^{(1)}[j][i] - \hat{a}^{(1)}[j] \cdot X(\tilde{c}^{(1)}[2j+1], \tilde{c}^{(1)}[2j])\right) \end{pmatrix} \cdot$$

$$\left((1-\tilde{c}^{(1)}[2j+1]) \cdot (1-p_{\tilde{c}^{(1)}, predem}[2j+1][i]) + \quad (21)\right.$$
$$\tilde{c}^{(1)}[2j+1] \cdot p_{\tilde{c}^{(1)}, predem}[2j+1][i]) \cdot$$
$$\left((1-\tilde{c}^{(1)}[2j]) \cdot (1-p_{\tilde{c}^{(1)}, predem}[2j][i]) + \tilde{c}^{(1)}[2j] \cdot p_{\tilde{c}^{(1)}, predem}[2j][i]\right)$$

Now, the post-demapping probability calculated by the optimum demapper for a perfectly synchronized receiver (i.e. $\tau_1 = 0$) is indicated as follows:

$$Pr(\tilde{c}^{(1)}[2j] = 1 \mid \tilde{y}^{(1)}[i], p_{\tilde{c}^{(1)}, predem}[i]) \quad (22)$$

$$= \frac{\Lambda^{(1)}(0,1)[j][i] + \Lambda^{(1)}(1,1)[j][i]}{\Lambda^{(1)}(0,0)[j][i] + \Lambda^{(1)}(0,1)[j][i] + \Lambda^{(1)}(1,0)[j][i] + \Lambda^{(1)}(1,1)[j][i]} \quad (23)$$

In a similar way, the demapper calculates the post-demapping probability for code bits with odd indices, as follows:

$$Pr(\tilde{c}^{(1)}[2j+1] = 1 \mid \tilde{y}^{(1)}[i], p_{\tilde{c}^{(1)}, predem}[i]) \quad (24)$$

$$= \frac{\Lambda^{(1)}(1,0)[j][i] + \Lambda^{(1)}(1,1)[j][i]}{\Lambda^{(1)}(0,0)[j][i] + \Lambda^{(1)}(0,1)[j][i] + \Lambda^{(1)}(1,0)[j][i] + \Lambda^{(1)}(1,1)[j][i]} \quad (25)$$

As usual with an iterative receiver, it is preferred that the probabilities that are exchanged between the participating receiver component are extrinsic probabilities. Accordingly, the demapper calculates the following extrinsic probabilities and passes them on to the decoder:

$$p_{\tilde{c}^{(1)}, extrdem}[k][i] = \frac{\frac{Pr(\tilde{c}^{(1)}[k]=1 \mid \tilde{y}^{(1)}[i], p_{\tilde{c}^{(1)}, predem}[i])}{p_{\tilde{c}^{(1)}, predem}[k][i]}}{\frac{1-Pr(\tilde{c}^{(1)}[k]=1 \mid \tilde{y}^{(1)}[i], p_{\tilde{c}^{(1)}, predem}[i])}{1-p_{\tilde{c}^{(1)}, predem}[k][i]} + \frac{Pr(\tilde{c}^{(1)}[k]=1 \mid \tilde{y}^{(1)}[i], p_{\tilde{c}^{(1)}, predem}[i])}{p_{\tilde{c}^{(1)}, predem}[k][i]}} \quad (26)$$

As it was already mentioned, a Gray mapping is used in the mappers 22a, 22b of FIG. 2. This means that a code bit of a pair $(\tilde{c}^{(1)}_{2j+1}, \tilde{c}^{(1)}_{2j})$ determines the I component of the QPSK symbol $x^{(l)}[j]$ and that the other code bit determines the Q component. The reason for this is, that the Gray mapping corresponds to some kind of encoding which is referred to as a systematic encoding in encoding theory, as the code bits may directly be identified in the QPSK symbol. From the encoding theory it is further known that the output signal of a decoder of the BCJR type, which is associated with a systematic encoder, has on average an improved reliability compared to the input into the decoder, independent of the signal/noise ratio (SNR). Thus, the systematic encoding is in particular advantageous for low signal/noise ratios and is therefore preferred for all iterative schemes which operate with low signal/noise ratios.

Although it may not seem illogical at first sight, to perform an iteration between a decoder and a QPSK demapper in case of a Gray mapping, it is still advantageous in the present case. The interference reduction in general leads to a non-circular distortion $d^{(1)}[j][i]$ in the samples $\tilde{y}^{(1)}[j][i]$, i.e. it turns out that in the equations 17 to 19 $\sigma_{d^{(1)},IQ}[j][i] \neq 0$ holds true. Therefore, the I and the Q components are statistically dependent on $\tilde{y}^{(1)}[j][i]$ Even when a Gray mapping is used and the information in the I or Q components, respectively, of $\tilde{y}^{(1)}[j][i]$ exactly corresponds to a code bit of the pair $(\tilde{c}^{(1)}[2j+1], \tilde{c}^{(1)}[2j])$, the pre-demapping probability of this single bit indeed influences the post-demapping probability for the other bits due to this statistical dependence.

As an example, the case is regarded, where the following Gray mapping is used:

$X(0,0) = -1-j$, $X(0,1) = 1-j$, $X(1,0) = -1+j$ and $X(1,1) = 1+j$

The bit $\tilde{c}^{(1)}[2j+1]$ is mapped onto the Q component. Further, the following is assumed: $\sigma_{d^{(1)},I}[j][i] = \sigma_{d^{(1)},Q}[j][i] = 0,5$ and $a^{(1)}[j] = 1$.

Figure 7:
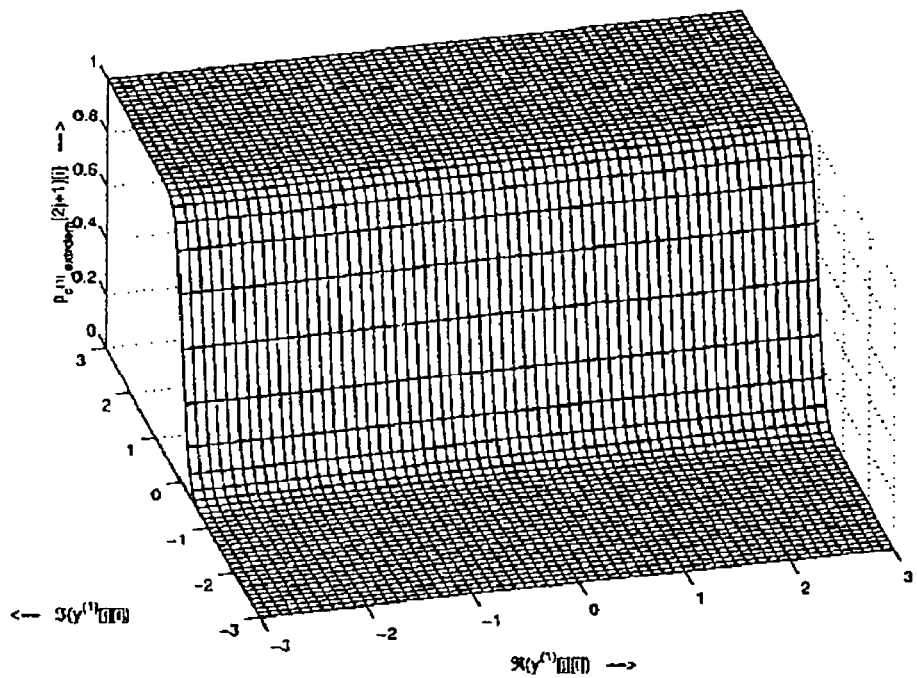
FIG. 7 shows a three-dimensional illustration of the transmitting function of a demapper without page information via real and imaginary parts of samples of the receiving signal.

FIG. 7 shows a calculation for $\sigma_{d^{(1)},IQ}[j][i] = 0$, i.e. the distortion $d^{(1)}[j][i]$ is circular. For this type of distortion it may be seen that $p_{\tilde{c}^{(1)},extrdem}[2j+1][i]$ is only dependent on the Q component of $\tilde{y}^{(1)}[j][i]$. This quantity is independent of the pre-demapping probability $p_{\tilde{c}^{(1)},predem}[2j][i]$ of the code bit in the I component.

Figure 8:
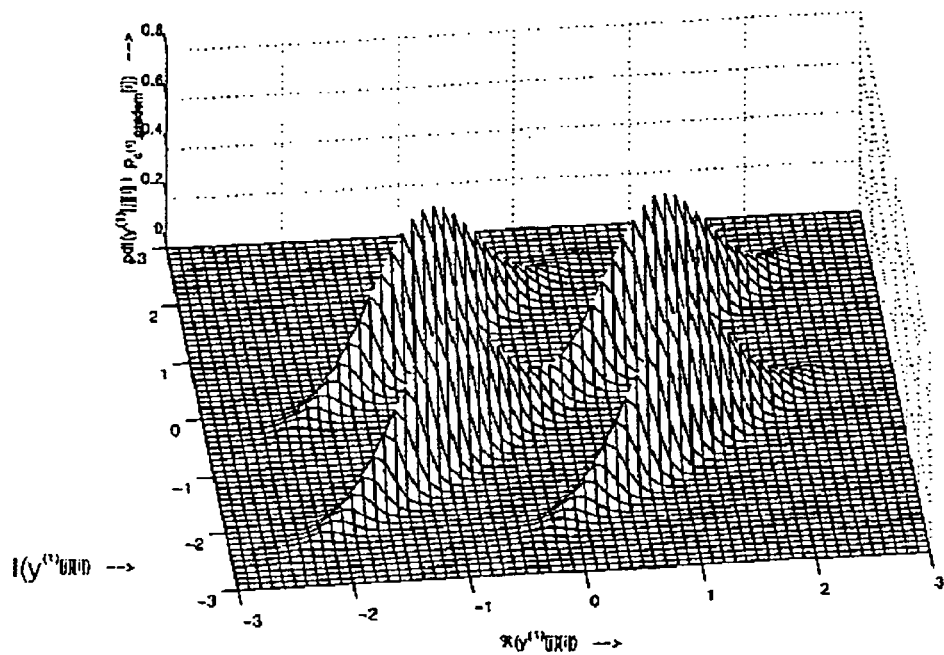
FIG. 8 shows the probability density function as a function of the real and imaginary parts in samples of the receiving signal.

When the following exemplary scenario is regarded $\sigma_{d^{(1)},IQ}[j][i] = 0.49$ and $p_{\tilde{c}^{(1)},predem}[2j+1][i] = p_{\tilde{c}^{(1)},predem}[2j][i] = \frac{1}{2}$, then it may be seen from the probability density function $pdf(\tilde{y}^{(1)}[j][i]|p_{\tilde{c}^{(1)},predem}[i])$ of the received sample, illustrated in FIG. 8, that the distortion is strongly non-circular.

Now, the extrinsic probability $p_{\tilde{c}^{(1)},extrdem}[2j+1][i]$ has the function shown in FIG. 9, and it may be seen, that the extrinsic probability for the code bit in the Q component depends on the Q and addition to that also on the I component of $\tilde{y}^{(1)}[j][i]$.

In addition to this, the same depends on the pre-demapping probability $p_{\tilde{c}^{(1)},predem}[2j][i]$ of the code bit in the I component. In order to illustrate this, the following assumptions for the pre-demapping probability for the I component are made: $p_{\tilde{c}^{(1)},predem}[2j][i] = 0.99$ and $p_{\tilde{c}^{(1)},predem}[2j+1][i] = 1/2$.

Figure 11:
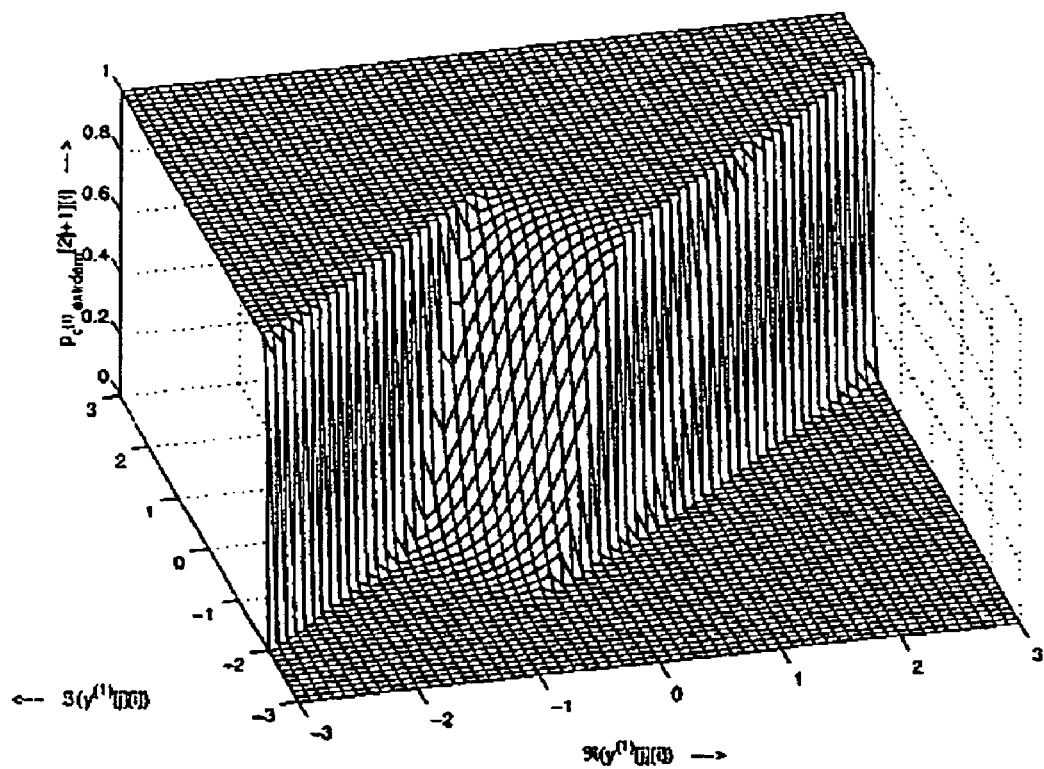
FIG. 11 shows an illustration of the transmitting function of the demapper based on different pre-demapping probabilities for an I component.

FIG. 10 shows the probability density function pdf($\tilde{y}^{(1)}[j][i]|p_{\tilde{c}^{(1)},predem}[i]$) while FIG. 11 shows p $_{\tilde{c}^{(1)},extrdem}[2j+1][i]$. The function of the extrinsic probability of the Q component became completely asymmetric and is different from the one shown in FIG. 7, that is due to the different pre-demapping probabilities for the I component.

The demapping for the second satellite is in principle performed like the demapping for the first satellite. The vectors $p_{\tilde{c}^{(1)},extrdem}[i]$ and $p_{\tilde{c}^{(2)},extrdem}[i]$ of the extrinsic probabilities, which are calculated by the soft demapper, are then, as it may be seen in FIG. 6, de-interleaved by the corresponding interleaver, wherein the de-interleavers are inverse to the corresponding interleavers in the transmitter.

The provision of at least one interleaver in a transmission branch and preferably of one individual interleaver for each transmission branch has three main advantages, which is why interleavers are preferred for one embodiment of the present invention.

1. The channel for the transmission system is a channel with fading. Therefore, strong fading occurrences also known as deep fades needs to be started by bringing the respective symbols to different locations in the code word.
2. The demapper and the decoder exchange iteratively extrinsic probabilities. Probabilities which are neighbored in the corresponding output vectors of an element are statistically dependent. On the other hand it is assumed, however, that neighboring probabilities are statistically independent at the input of an element. For each iterative system an optimum performance is achieved when this assumption of the statistical independence of the input symbols is fulfilled. Therefore it is preferred to employ an interleaver in order to distribute neighboring elements in the output sector of an element to different places or elements, respectively, at the input of the other element. This proceeding is usually also referred to as "decorrelation of the extrinsic probabilities".
3. Due to the interference reduction in the present inventive receiver concept, the distortion in $\tilde{y}^{(1)}[i]$ and $\tilde{y}^{(2)}[i]$ is indeed colored. If, for example, an error is made in the interference reduction and the distortion is very high, then not only a QPSK symbol is severely interfered with but several successive QPSK symbols are severely interfered with. Like in a fading channel, also these error bursts need to be distributed by distributing the same to different places in the code word.

As interleavers, further s-random interleavers are preferred, as has already been discussed. Due to their spreading limitation they guarantee that neighboring elements are indeed brought to remote output elements at their input, so that deep fades and error bursts are eliminated. On the other hand, it turned out, that a random, i.e. non-regular interleaver in iterative systems shows a better performance than a regular structure.

The de-interleaved vectors $p_{\tilde{c}^{(1)},predec}[i]$ and $p_{\tilde{c}^{(2)},predec}[i]$ of the pre-decoding probabilities for the sub-code-words $c^{(1)}$ and $c^{(2)}$ are finally serial/parallel converted and serve as an input into the SISO decoder. Based on these pre-decoding probabilities $p_{c,predec}[i]$, the new post-decoding probabilities $p_{c,postdec}[i]$ and the extrinsic probabilities $p_{c,extrdec}[i]$ can be calculated.

Now, an iteration i of the receiver is completed. As $p_{c,postdec}[i]$ and $p_{c,extrdec}[i]$ provide a generally better reliability compared to $p_{c,postdec}[i-1]$ and $p_{c,extrdec}[i-1]$, these vectors may be used for a further iteration i+1 in order to further improve the interference reduction. When the iterative system correctly converges, then the vectors $\tilde{y}^{(1)}[i]$ and $\tilde{y}^{(2)}[i]$ will be interference-free after several iterations. Then the decoder gives the post-decoding probabilities $p_{c,postdec}[i]$ for the information bits u to a threshold value separator 555 of FIG. 6, which provides a vector û of estimated information bits to the information sink 62.

As no output signal of the decoder exists in the first pass, i.e. before the first iteration, it is preferred to take average probabilities $p_{c,postdec}[0]=p_{c,extrdec}[0]=[1/2\ 1/2\ \ldots\ 1/2]$ as an output value for this iteration. These probabilities indicate that every code bit $c_k$ may be a "0" with the same probability 1/2 as a "1". Accordingly, the estimated interference is $$\hat{y}_{int}^{(1)}[1] = \hat{y}_{int}^{(2)}[1] = 0.$$

Thus, in the first iteration no interference reduction is achieved. The inventive soft demappers 541a, 541b work equal to conventional QPSK demappers, by setting $p_{c,extrdec}[0]=[1/2\ 1/2\ \ldots\ 1/2]$. Conventional QPSK demappers work without page information given by the pre-demapping probabilities. Thus, the first iteration of the regarded receiver corresponds to that of a simple receiver without interference cancellation and with a conventional QPSK demapper.

As a dimensioning example, an information word with a length of 494 information units may be used. With a code memory nu=6 and a code rate $R_c$ of 1/4 a code word length of N=1000 and a length $\tilde{K}$=500 of the vectors of QPSK symbols results. A subgroup of code units also comprises 1000 code units. Thus, the overall rate of the system is R=494:500=0.99. Both used interleavers of the length N/2=1000 may be implemented as different s-random interleavers with a spread value s=17. The transmission filter G(f) of the system may be implemented as a square-root raised cosine filter with a roll-off factor $\alpha$=0.2.

For the simulation or estimation of the transmission channels, respectively, the channels are simulated as Rice fading, i.e. they comprise a LOS component (LOS=Line Of Sight) and further a Rayleigh fading component with a corresponding variance. For a simulation, the normalized maximum Doppler frequency of these processes may be assumed to be 0.01. For the two statistically independent Rice fading processes corresponding Rice factors may be indicated.

Simulations indicated, that already after a few (mainly already after five) iteration steps no substantial improvement may be determined any more. A convergence may therefore be achieved after five iteration steps at most.

It is to be noted, that for the synchronization of the sampler 40 different known concepts may be used, like e.g. training sequences, that are sent from the two different transmitters and from which a sampler may synchronize to the corresponding transmitter. In order to suppress interferences during this synchronization forerun, for example in a predetermined time window, which is known to the receiver, always only one transmitter could transmit such that an optimum synchronization with a low interference may be achieved. For the calculation of the interference signals, in which channel parameters are used in order to accommodate the weighting in the multipliers 581a and 581b, conventional channel-estimation methods may be applied which also operate with training sequences. Alternatively, also blind estimation methods exist which may achieve a channel estimation without pre-known training sequences.

The same holds true also for the transmission filters 582a, 582b of FIG. 6 which model a non-ideal synchronization of the sampler. As a first approximation, the transmission functions of these filters may be set to "1" when an ideal synchronization is assumed. Depending on the application, this transmission function may also be estimated empirically.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A receiving device for receiving an overlaid receiving signal corresponding to a superposition of a first and a second transmitting signals, respectively, transmitted by a first transmitter and a second transmitter arranged remote from the first transmitter, wherein the first and the second transmitting signals lie in the same frequency band, wherein the first transmitting signal is generated, using a first transmitting subgroup of code units, wherein the second transmitting signal is generated using a second transmitting subgroup of code units, wherein the first transmitting subgroup of code units and the second transmitting subgroup of code units together represent a plurality of code units which were generated by a redundancy-adding encoding from an information word with a plurality of information units, comprising:

a sampler for sampling the overlaid receiving signal synchronously to the first transmitter in order to obtain a first receiving signal associated with the transmitted first transmitting signal, and for sampling the overlaid receiving signal synchronously to the second transmitter in order to obtain a second receiving signal associated with the transmitted second transmitting signal;

a decoder for decoding the first and the second receiving signal in order to obtain a first receiving subgroup of code units associated with the first transmitting subgroup of code units, and to decode the first and the second receiving signal in order to obtain a second receiving subgroup of code units associated with the second transmitting subgroup of code units;

a calculator for calculating a first interference signal using the second receiving subgroup of code units and a second interference signal using the first receiving subgroup of code units;

an interference reducer for combining the first interference signal with the first receiving signal and for combining the second interference signal with the second receiving signal in order to obtain an improved first receiving signal and an improved second receiving signal; and a controller for controlling the decoder so that the decoder decodes the improved first receiving signal and the improved second receiving signal and outputs the information word with the plurality of information units based on the improved first receiving signal and the improved second receiving signal.

2. The receiving device according to claim 1, wherein the controller is implemented in order to control the interference reducer and the calculator so that the calculator calculates a further improved first and second information signal using the improved first receiving signal and the improved second receiving signal by means of one or several iteration steps, and in order to control the decoder in order to obtain the information word with the plurality of information unite using the further improved first receiving and the further improved second receiving signal.

3. The receiving device according to claim 1, wherein the decoder comprises:
a mapper for converting the first receiving signal or the second receiving signal into pre-decoding probabilities for the first receiving subgroup of code units and for the second receiving subgroup of code units;
a soft-in-soft-out decoder for calculating a post-decoding probability for the first and the second receiving subgroup of code units; and
an estimator for estimating the first and the second receiving subgroups on the basis of the post-decoding probability for the first and the second receiving subgroup of code units.

4. The receiving device according to claim 3, wherein the soft-in-soft-out decoder is a BCJR decoder (BCJR=Bahl Cocke Jelinek Raviv).

5. The receiving device according to claim 3,
wherein an interleaving function is present when generating the first and the second transmitting signal, and
wherein the decoder further comprises:
a de-interleaver for cancelling the interleaving function for the first or the second transmitting signal, wherein the de-interleaver is connected between the mapper and the decoder; and
an interleaver which is implemented in order to perform the same inter leaving function, wherein the interleaver is arranged between the decoder and the estimator.

6. The receiving device according to claim 3,
wherein the mapper is implemented in order to operate using page information from a preceding iteration step, and
wherein the page information is extrinsic probabilities derived from the post-decoding probabilities.

7. The receiving device according to claim 6,
wherein the sampler is implemented in order to be synchronized using a predetermined training sequence from the first transmitter and a predetermined training sequence from the second transmitter.

8. The receiving device according to claim 3,
wherein the calculator further comprises:
weighting unit for weighting the second receiving subgroup of code units or a modulation symbol with a channel characteristic derived from the second receiving subgroup of code units, in order to obtain a weighted second receiving subgroup or a weighted modulation symbol;
a second unit for weighting the first receiving subgroup of code units or a modulation symbol with a channel characteristic derived from the first receiving subgroup, in order to obtain a weighted first receiving subgroup or a weighted modulation symbol.

9. A receiving device according to claim 3,
wherein the mapper is a QPSK demapper (QPSK=Quaternary Phase Shift Keying), and
wherein the estimator is an MMSE estimator (MMSE=Minimum Mean Squared Error).

10. A method for receiving an overlaid receiving signal corresponding to an overlay of a transmitted first and second transmitting signals, respectively, by a first transmitter and by a second transmitter which is arranged remote from the first transmitter, wherein the first and the second transmitting signals lie in the same frequency band, wherein the first transmitting signal is generated using a first transmitting subgroup of code units, wherein the second transmitting signal is generated using a second transmitting subgroup of code units, wherein the first transmitting subgroup of code units and the second transmitting subgroup of code units together represent a plurality of code units which were generated by a redundancy-adding encoding from an information word with a plurality of information units, comprising:
sampling the overlaid receiving signal synchronously to the first transmitter in order to obtain a first receiving signal associated with the transmitted first transmitting signal;
sampling the overlaid receiving signal synchronously to the second transmitter in order to obtain a second receiving signal associated with the transmitted second transmitting signal;
decoding the first and the second receiving signal in order to obtain a first receiving subgroup of code units associated with the first transmitting subgroup of code units;
decoding the first and the second receiving signal in order to obtain a second receiving subgroup of code units associated with the second transmitting subgroup of code units;
calculating a first interference signal using the second receiving subgroup of code units and a second interference signal using the first receiving subgroup of code units;
combining the first interference signal with the first receiving signal and combining the second interference signal with the second receiving signal in order to obtain an improved first receiving signal and an improved second receiving signal in order to obtain an interference reduction; and
decoding the improved first receiving signal and the improved second receiving signal and outputting the information word of the plurality of information units based on the improved first receiving signal and the improved second receiving signal.

* * * * *